United States Patent [19]

Fourquier et al.

[11] Patent Number: 5,420,179
[45] Date of Patent: May 30, 1995

[54] COMPOSITIONS BASED ON UNSATURATED POLYESTER RESINS AND ON NEW ANTISHRINKAGE ADDITIVES

[75] Inventors: Dominique Fourquier, La-Croix-Saint-Ouen, France; Laurent Suspene, Mequon, Wis.

[73] Assignee: Cray Valley, S.A., Verneuil en Hallatte, France

[21] Appl. No.: 941,121

[22] PCT Filed: Apr. 25, 1991

[86] PCT No.: PCT/FR91/00347

§ 371 Date: Dec. 22, 1992

§ 102(e) Date: Dec. 22, 1992

[87] PCT Pub. No.: WO91/17214

PCT Pub. Date: Nov. 14, 1991

[30] Foreign Application Priority Data

May 4, 1990 [FR] France ................. 90 05631

[51] Int. Cl.$^6$ .............................................. C08L 67/06
[52] U.S. Cl. ..................... 523/523; 523/527; 525/170
[58] Field of Search ............ 525/170; 523/527, 523

[56] References Cited

U.S. PATENT DOCUMENTS

| | | | |
|---|---|---|---|
| 3,956,421 | 5/1976 | Roberts et al. | 260/862 |
| 4,579,890 | 4/1986 | Domeier | 523/512 |
| 4,626,570 | 12/1986 | Gardner | 525/12 |

FOREIGN PATENT DOCUMENTS

| | | |
|---|---|---|
| 0068487A2 | 1/1983 | European Pat. Off. |
| 48-049884 | 7/1973 | Japan . |
| 48-051090 | 7/1973 | Japan . |

OTHER PUBLICATIONS

Chemical Abstract 48205t of South African 6704330.
Chemical Abstract 84093v of S. Hajime et al., Japan Kokai 73 51,090, Jul. 18, 1973.
Chemical Abstract 48653u of S. Hajime et al., Japan Kokai 73 49,884, Jul. 13, 1973.

*Primary Examiner*—Patricia A. Short
*Attorney, Agent, or Firm*—David G. Conlin; Peter F. Corless

[57] ABSTRACT

Liquid resinous compositions suitable for the moulding of objects reinforced with glass fibres and capable of being pigmented, comprising an unsaturated polyester, a copolymerisable monomer and a partially hydroxylated alkyl methacrylate polymer.

A hydroxylated alkyl methacrylate polymer which is soluble in the monomer and miscible with the unsaturated polyester is chosen.

Application to the manufacture of objects moulded by bulk, sheet and injection moulding.

10 Claims, No Drawings

COMPOSITIONS BASED ON UNSATURATED POLYESTER RESINS AND ON NEW ANTISHRINKAGE ADDITIVES

The present invention relates more particularly to compositions consisting of unsaturated polyester resins and of new antishrinkage additives.

Unsaturated polyester resins are employed in many fields of application, in particular for moulding objects reinforced with glass fibres. They are widely employed for the manufacture of motor vehicle components, of bathroom fittings and accessories, of cabinets for electronic apparatus, of kitchen utensils, furniture units, etc. A major disadvantage of the use of unsaturated polyester resins is the fact that these resins exhibit a considerable volume shrinkage during moulding, which is produced as the polyester resin polymerises. This volume shrinkage of polyester resins then results in a rough finished surface which makes it possible to discern the glass fibres which generally appear to project over the surface of the finished product and even allow undulations to be perceived.

The majority of the applications in which unsaturated polyester resins reinforced with glass fibres are involved require impeccable finished surfaces. This is the case, for example, with motor vehicle components. Various techniques have been proposed for improving the surface finish. The sanding technique has, for example, been employed, followed by a filling operation. It has also been proposed to employ coats of polyester resins in the form of gels (gel coat) which enable the glass fibres to be masked. All these techniques, which are arduous to use, have the disadvantages of increasing the costs of manufacture and of reducing the production efficiency.

Antishrinkage additives have also been proposed, including thermoplastic pollers. In particular, C.A. 80, 84093v describes, as antishrinkage additive, a solution of 20 to 30 parts of a thermoplastic copolymer (such as a copolymer comprising 85% of methyl methacrylate, 10% of 2-hydroxyethyl methacrylate and 5% of methacrylic acid) in 70 to 80 parts of styrene containing less than 20% of at least one hydroxyalkyl (meth)acrylate. A composite obtained from an unsaturated polyester in styrene containing this additive exhibits a shrinkage of 3.1%. This additive is insoluble in styrene and immiscible with the unsaturated polyester, probably because of an excessively high molecular weight, which results in an excessively high volume shrinkage.

These known antishrinkage additives have the disadvantage of separating into two layers when added to the polyester resins. That is to say that they form a mixture which is not homogeneous, the constituents being immiscible at room temperature. Furthermore, it is often necessary to pigment the resin compositions, particularly in a dark shade. The use of resinous compositions involving these thermoplastic polymers results in pigmented compositions which are in most cases homogeneous after moulding. From the viewpoint of appearance, they resemble resin compositions without any antishrinkage additive, but they have the disadvantage of not being able to be stored, and this makes it necessary to market them in two parts, that is to say to deliver, on the one hand, the polyester resins and, on the other hand, the additives.

There is therefore a perceived need for developing unsaturated polyester compositions containing antishrinkage additives which can be stored and which, when pigmented, must be homogeneous and must have good mechanical properties. In addition, these additives must have the particular property of being miscible with the unsaturated polyester resins at room temperature. The miscibility, or the homogeneity, of a mixture is established when the latter has one and only one glass transition temperature.

The present invention relates to liquid resinous compositions suitable especially for the moulding of objects reinforced with glass fibres and capable of being homogeneously pigmented, comprising an unsaturated polyester, at least one monomer copolymerisable with the unsaturated polyester, and an at least partially hydroxylated alkyl methacrylate polymer, which are characterised in that the said hydroxylated alkyl methacrylate polymer is soluble in the monomer and miscible with the unsaturated polyester.

It has been found that the use of the resinous compositions according to the invention makes it possible after moulding to obtain perfectly homogeneous finished products which have good mechanical properties.

The hydroxylated alkyl methacrylate polymer used according to the invention preferably has a hydroxyl equivalent per kilogram of polymer of approximately between 0.1 and 12, preferably between 0.25 and 10, a molecular weight of approximately between 1,000 and 20,000, more particularly approximately between 1,500 and 15,000, and a glass transition temperature of approximately between 30° and 100° C. They are obtained by copolymerisation of alkyl methacrylate(s) in which the alkyl group preferably has 1 to 4 carbon atoms, and of unsaturated monomer(s) bearing at least one hydroxyl functional group, preferably chosen from the following products: allyl alcohol, hydroxyalkyl acrylates and methacrylates such as 2-hydroxyethyl and hydroxypropyl (meth)acrylates, partial acrylic or methacrylic esters of di- or polyhydroxylated compounds such as the mono(meth)acrylate of ethylene glycol, of 1,2- or 1,3-propylene glycol, of 1,4-butylene glycol, of 1,6-hexamethylene glycol, of diethylene glycol, of triethylene glycol or of dipropylene glycol, glycerol mono(meth)acrylate, pentaerythritol mono(meth)acrylate, and the like. Chain transfer agents in a quantity of between 0 and 10% by weight of the alkyl polymethacrylate, which are chosen from ethyl mercaptan, n-octyl mercaptan, n-dodecyl mercaptan, thioglycolic acid, the diester of ethylene glycol and of thioglycolic acid, and thioglycerol, may be employed to fix accurately the molecular mass of the polymethacrylates used in the present invention. A radical polymerisation initiator is employed in a quantity of between 0.001 and 5% and preferably approximately between 0.1 and 3% by weight relative to the weight of the starting reactants. These initiators are chosen especially from benzoyl, lauroyl, acetylcyclohexanesulphonyl, diisobutyryl and decanoyl peroxides, t-butyl hydroperoxide, di(2-ethylhexyl) and diisopropyl peroxydicarbonates, t-butyl peroxypivalate, azobisisobutyronitrile, 4,4'-azobis-4-cyanopentanoic acid, 3,3'-azobis-3-cyanobutanol, and the like.

The hydroxylated alkyl methacrylate polymers used according to the present invention can be obtained by two different processes, depending on the desired molecular weight: those of molecular weight not exceeding approximately 10,000 are preferably prepared in solution in an organic solvent, especially an aromatic hydrocarbon such as toluene, or a ketone such as methyl ethyl ketone or methyl isobutyl ketone, at a temperature approximately from 80° to 110° C.; those of molecular weight exceeding approximately 10,000 are preferably prepared in suspension in water at a temperature approximately from 70° to 95° C., in the presence of at least one surface-active agent such as a copolymer of methyl methacrylate and methacrylic acid, a disodium phosphate, a polyvinyl alcohol, and the like.

The unsaturated polyesters used according to the invention are prepared by condensing a dicarboxylic acid or its anhydride containing alpha,beta ethylenic unsaturation or mixtures of these with a dialcohol or a mixture of dialcohols or of their ethers. As examples of unsaturated dicarboxylic acids or anhydrides there may be mentioned maleic anhydride, fumaric acid, itaconic acid, citraconic acid and chloromaleic acid. A small proportion of the unsaturated dicarboxylic acid (up to 25 mol %) may be replaced with saturated dicarboxylic acids such as ortho-phthalic, isophthalic, terephthalic, succinic, adipic, sebacic or methylsuccinic acids, and the like. The dialcohols or their ethers used with the dicarboxylic acids are, in a known manner: 1,2-propanediol (propylene glycol), dipropylene glycol, diethylene glycol, ethylene glycol, 1,3-butanediol, 1,4-butanediol, neopentyl glycol, triethylene glycol, tripropylene glycol, ethylene oxide, etc. In a known manner, the reactants are used so as to give the finished polyester a factor of molecular weight per double bond of approximately between 142 and 215, preferably between 147 and 186. Poly(propylene fumarate), poly(ethylene propylene fumarate), poly(dipropylene fumarate), poly(propylene dipropylene fumarate), poly(propylene isophthalate/fumarate), and the like, are preferred. These polyesters can be prepared from maleic anhydride or fumaric acid.

The monomers which are copolymerisable with the unsaturated polyester are, in a known manner, styrene, substituted styrenes such as vinyltoluene and tert-butylstyrene. Other ethylenically unsaturated monomers which may, if appropriate, be employed in combination with the above monomers, in quantities of less than 50% by weight, include the lower alkyl ($C_1$-$C_4$) esters of acrylic acid and of methacrylic acid, alpha-methylstyrene, cyclic (such as cyclohexyl) or aromatic (such as benzyl) acrylates and methacrylates, bicyclic (such as isobornyl) methacrylates and acrylates, halogenated styrenes such as chlorostyrene and dichlorostyrene, 1,3-butanediol dimethacrylate, diallyl phthalate, and the like.

The proportions of the components of the resinous system of the present invention vary greatly, depending on the requirements of the moulding composition and the envisaged final applications. The unsaturated polyester may be present in proportions of 20 to 80%, preferably between 25 and 60%, and even between 30 and 50% by weight relative to the weight of the resinous system. The copolymerisable monomer(s) may be present in proportions of approximately between 20 and 80% of the weight of the resinous system and preferably between 25 and 75%, and even approximately between 40 and 65% by weight of the resinous system. The glass fibres which may be present in the case of the moulding of reinforced objects are used in a proportion ranging up to approximately 90% by weight relative to the weight of the entire resinous composition. The anti-shrinkage additive may be present in proportions of approximately between 1 and 30%, preferably between 5 and 20%, relative to the weight of the resinous system.

The resinous compositions according to the present invention may additionally comprise at least one demoulding agent such as especially an alkali or alkaline-earth metal or zinc salt of a fatty acid. As examples of these salts there may be mentioned zinc, calcium, lithium, barium and magnesium stearates and the calcium salt of montanic acid. This latter salt is a calcium salt of a $C_{24}$, $C_{26}$, $C_{30}$, $C_{32}$ and $C_{28}$ fatty acid cut, montanic acid of formula $C_{27}H_{55}COOH$ being preponderant. This salt is manufactured from a natural product, montan wax, which is extracted from lignites. This salt is manufactured by oxidizing montan wax with the aid, for example, of a hot sulphochromic mixture: the oxidation products obtained (fatty acids) are then neutralised with calcium carbonate or hydroxide. The commercial montanate which is generally available contains approximately 5% of calcium and up to approximately 3% by weight of free acids. The demoulding agent is preferably employed in a quantity of between approximately 1% and 8% by weight relative to the weight of the unsaturated polyester resin and of the copolymerisable monomer used with the polyester resin.

The resinous compositions according to the present invention may be employed in bulk moulding compounds. These bulk moulding compounds (BMC) consist of unsaturated polyester resins in a copolymerisable monomer to which an organic peroxide has been added as polymerisation catalyst, of fillers such as calcium carbonate, of approximately from 10 to 30% by weight of glass fibres, of a demoulding agent and of the anti-shrinkage agent according to the invention. After mixing has taken place, the mouldable compound is introduced into a mould of appropriate shape, and the mould is then closed and heated to polymerise the compound. Moulding may be carried out by using any of the techniques which are known in this technology: compression, transfer, injection/compression and injection moulding. During the moulding the mould is kept at a temperature of approximately between 130° and 180° C. and at a pressure of approximately from 30 to 100 bars for not more than 2 minutes. By using this technique it is possible to manufacture moulded objects of all kinds such as especially lamp reflectors for motor vehicles which, after demoulding, are subjected to an aluminising treatment, preferably after deposition of a polyester, epoxy or acrylic resin varnish.

The resinous compositions according to the present invention may also be employed in sheet moulding compounds and systems (SMC), for injection moulding and for resin transfer moulding (RTM).

The following examples illustrate the present invention: all the parts and all the percentages are given by weight, unless stated otherwise.

EXAMPLE 1: (Comparative)

A mixture is produced from 56 parts of unsaturated polyester resin in solution with a solids content of 66% in styrene, 30 parts of solution at a concentration of 50% in styrene of polymethyl methacrylate with a molecular mass of 50,000 (the molecular masses are determined by size exclusion chromatography) and 14 parts of styrene.

The unsaturated polyester resin employed is manufactured from 98 parts of maleic anhydride and 84 parts of propanediol until a number-average molecular mass of approximately 1,500 is obtained; its acid value is 30 and its hydroxyl value 45. It is then diluted in styrene in the presence of hydroquinone, employed as inhibitor.

4 parts of acetylene black pigment are dispersed in the mixture produced above, which is immiscible and which separates quickly, together with 0.02% of para-benzoquinone and 1.5% of tert-butyl perbenzoate employed as crosslinking initiator.

This preparation is used between the platens of a press heated to 140° C., at the interface of 2 polyethylene terephthalate sheets whose thickness and leaktightness are ensured by a Teflon backing piece 4 mm in thickness. After 4 minutes' cure, the sample is uniform in colour; the preparation, immiscible, can be pigmented. The medium exhibits two glass transition temperatures.

EXAMPLE 2 (Comparative)

A mixture similar to that produced in Example 1 is produced by replacing the polymethyl methacrylate with 37.5 parts of polyvinyl acetate with a molecular mass of 40,000 (sold under the trademark LP 40A by Union Carbide), in solution with a solids content of 40% in styrene. Under these conditions the quantity of styrene which is added is 6.5 parts.

The mixture is miscible and in the case of use conditions identical with those of the preceding example the sample is nonuniform in colour; the preparation is miscible but not pigmentable.

EXAMPLE 3

A mixture identical with that produced in Example 1 is produced by replacing the polymethyl methacrylate with an identical quantity of polymethyl methacrylate with a molecular mass of 1560, a glass transition temperature $T_g = 57°$ C., and which has 0.5 hydroxyl equivalents per kilogram of polymer.

This hydroxylated polymer is obtained by continuous casting polymerisation, at 90° C. in toluene, of 1,900 parts of methyl methacrylate in the presence of 41 parts of azobisisobutyronitrile employed as initiator, and of 78 parts of mercaptoethanol employed as chain transfer agent. At the end of polymerisation the toluene is removed; 0.01% of hydroquinone is then added as polymerisation inhibitor, together with the quantity of styrene needed to obtain the required solids content.

The mixture, which is miscible, is used at various temperatures in the presence of a suitable catalyst system:
- at 60° C. with 1.5% of acetylacetone peroxide, 0.35% of cobalt octoate containing 6% of metal, 0.15% of dimethyl-para-toluidine and 0.02% of hydroquinone;
- at 110° C. with 1.5% of tert-butyl peroctoate and 0.02% of para-benzoquinone;
- at 145° C. with 1.5% of tert-butyl perbenzoate and 0.02% of para-benzoquinone.

Whatever the conditions of catalysis, the samples exhibit a uniform colour; the preparation is miscible and pigmentable.

EXAMPLE 4 (Comparative)

A mixture identical with that produced in Example 3 is produced by employing a polymethyl methacrylate of the same molecular mass, but which does not carry any hydroxyl functional groups. Octylmercaptan is employed as chain transfer agent for this purpose.

The mixture is not miscible and its use in the various temperature and catalysis conditions described in Example 3 results in test specimens which do not exhibit a uniform colour; the preparation is immiscible and cannot be pigmented.

EXAMPLES 5 and 6

Other polymethyl methacrylates of different molecular masses and hydroxyl functional group contents are produced by the operating procedure described in Example 3:
- 4,250 and 0.49 hydroxyl functional groups per kilogram with a glass transition temperature of 93° C. in the case of Example 5;
- 5,170 and 0.50 hydroxyl functional groups per kilogram with a Tg of 101° C. in the case of Example 6.

The polymer with a molecular mass of 4,250 is obtained from 7,600 parts of methyl methacrylate, 390 parts of 2-hydroxyethyl methacrylate, 78 parts of mercaptoethanol and 41 parts of azobisisobutyronitrile.

The polymer with a molecular mass of 5,170 is obtained from 15,200 parts of methyl methacrylate, 910 parts of 2-hydroxyethyl methacrylate and 41 parts of azobisisobutyronitrile.

The mixtures with a composition identical with those described in Example 3 and produced by starting with each of these additives are miscible. When they are processed at 110° and 145° C., with the corresponding catalyst systems, they produce test specimens which exhibit a uniform colour; the preparations are miscible and pigmentable.

EXAMPLE 7

A polymethyl methacrylate of average molecular mass 2,400 and which contains 0.49 hydroxyl equivalents per kilo of polymer is produced first of all by the operating method described in Example 3 by employing 3,800 parts of methyl methacrylate, 130 parts of 2-hydroxyethyl methacrylate, 78 parts of mercaptoethanol and 41 parts of azobisisobutyronitrile.

This additive is processed according to the following formulation:

| | |
|---|---|
| Unsaturated polyester resin (that of Example 1) | 68 |
| Hydroxylated polymethacrylate (at a concentration of 47% in styrene) | 32 |
| Demoulding agent (Acmos 82805) | 1 |
| Hydroquinone | 0.02 |
| Acetylene black | 4 |
| Calcium carbonate (OMYA Millicarb) | 40 |
| Cobalt octoate containing 6% of metal | 0.35 |
| Dimethyl-para-toluidine | 0.15 |
| Acetylacetone peroxide | 1.5 |
| Glass mat | 35 |
| Moulding temperature (°C.) | 60 |
| Cure time (minutes) | 6 |
| Moulding pressure (bar) | 20 |

This mixture is processed in a formulation of the RTM (resin transfer moulding) type.

The press described in Example 1 is employed. A compression mould (square piece with a 10-cm side and 4 mm in thickness) is installed between the platens. The mixture is cast, the mould which contains the glass reinforcement being open, and the press is then quickly closed again.

After demoulding, the article has a uniform colour and a linear shrinkage limited to 0.07%.

This formulation produces a mixture which is miscible and pigmentable and has a compensated shrinkage.

EXAMPLE 8

A formulation of the sheet moulding composition type is produced from the polymethyl methacrylate of Example 5.

This additive is processed in the following formulation:

| Unsaturated polyester resin (that of Example 1) | 53 |
| --- | --- |
| Hydroxylated polymethylacrylate (at a concentration of 50% in styrene) | 30 |
| Styrene | 17 |
| Demoulding agent (Acmos 82805) | 1.5 |
| para-Benzoquinone | 0.02 |
| Acetylene black | 4 |
| Magnesia | 4.5 |
| Calcium carbonate (OMYA Millicarb) | 120 |
| tert-Butyl perbenzoate | 1.5 |
| Chopped glass fibres | 55 |
| Moulding temperature (°C.) | 135 |
| Cure time (minutes) | 4 |
| Moulding pressure (bar) | 80 |

The press and the mould described in Example 7 are employed. The dough is deposited between the platens of the mould and the press is closed again quickly.

After demoulding, the moulded article exhibits a linear shrinkage of 0.05%.

This formulation produces a miscible mixture with compensated shrinkage.

EXAMPLE 9

A formulation of the bulk moulding type is produced by employing the polymethyl methacrylate of Example 6.

This additive is processed according to the following formulation:

| Unsaturated polyester resin (that of Example 1) | 53 |
| --- | --- |
| Hydroxylated polymethacrylate (at a concentration of 50% in styrene) | 30 |
| Styrene | 17 |
| Demoulding agent (Acmos 82805) | 1.5 |
| para-Benzoquinone | 0.02 |
| Acetylene black | 4 |
| Calcium carbonate | 250 |
| tert-Butyl peroctoate | 1.5 |
| Glass fibres | 90 |
| Moulding temperature (°C.) | 150 |
| Cure time (minutes) | 3 |
| Moulding pressure (bar) | 80 |

The press and the mould described in Example 7 are employed. The dough is deposited between the platens of the mould and the press is closed again quickly.

After demoulding, the article has undergone a swelling of 0.05%.

This formulation produces a miscible mixture, of good surface appearance.

EXAMPLE 10

A formulation of the bulk moulding composition type is prepared from 70 parts by weight of the unsaturated polyester resin of Example 1 and 30 parts by weight of the hydroxylated polymethacrylate of Example 3 (at a concentration of 50% in styrene).

This mixture is processed according to the formulation and the operating method of Example 9.

After demoulding, the article has a shrinkage of 0.15% and exhibits a uniform colour.

This formulation produces a mixture which is miscible and pigmentable, with partially compensated shrinkage.

EXAMPLE 11

A polymethyl methacrylate with an average molecular mass of 13,000 and which has 5.2 hydroxyl equivalents per kilogram of polymer is prepared first of all, according to the following operating method:

The suspension agent is obtained by mixing 7.5 g of Rohagit MV (Rohm and Haas), 31.2 g of anhydrous disodium phosphate and 960 g of water. 450 g of water, 50 g of NaCl, 30 g of suspension agent, 240 g of methyl methacrylate, 48 g of hydroxyethyl methacrylate, 4 g of lauryl mercaptan and 2 g of lauroyl peroxide are charged into a reactor. The mixture is heated to 77° C. with vigorous stirring and under nitrogen blanketing. At the end of 20 minutes 20 g of suspension agent are added and the temperature is kept constant for 1 hour. At the end of the gel effect the temperature is kept constant for 1 hour. The mixture is then cooled, washed and dried. The polymer obtained is dissolved in styrene in the presence of 0.01% of hydroquinone.

This additive is processed according to the following formulation:

| Unsaturated polyester resin (that of Example 1) | 56 |
| --- | --- |
| Hydroxylated polymethacrylate (at a concentration of 50% in styrene) | 44 |
| Demoulding agent (calcium stearate) | 4 |
| para-Benzoquinone | 0.02 |
| Acetylene black | 4 |
| Calcium carbonate | 250 |
| tert Butyl perbenzoate | 1.5 |
| Glass fibres | 90 |
| Moulding temperature (°C.) | 150 |
| Cure time (minutes) | 3 |
| Moulding pressure (bar) | 80 |

An industrial press, on which a disc carrier 200 mm in diameter is mounted, is employed.

After demoulding, the article has undergone a swelling of 0.05%.

This formulation results in a miscible mixture, with good surface appearance.

We claim:

1. A liquid resinous composition comprising an unsaturated polyester, at least one monomer consisting of styrene and/or substituted styrenes and copolymerisable with the unsaturated polyester and an at least partially hydroxylated alkyl methacrylate polymer, wherein said hydroxylated alkyl methacrylate polymer 1) has a molecular weight of between about 1,000 and 20,000 by size exclusion chromatography, 2) is soluble in the monomer and miscible with the unsaturated polyester, and 3) is a copolymer of alkyl methacrylate(s) in which the alkyl group has from 1 to 4 carbon atoms and of unsaturated monomers bearing at least one hydroxyl group.

2. A resinous composition according to claim 1 where the hydroxylated alkyl methacrylate polymer has a hydroxyl equivalent per kilogram of polymer of between 0.1 and 12.

3. A resinous composition according to claim 1 where the hydroxylated alkyl methacrylate polymer has a glass transition temperature of between 30° and 110° C.

4. A resinous composition according to claim 2 where the hydroxylated alkyl methacrylate polymer has a glass transition temperature of between 30° and 110° C.

5. A resinous composition according to claim 1 where the hydroxylated alkyl methacrylate polymer has a glass transition temperature of between 30° and 110° C.

6. A resinous composition according to claim 1 where the unsaturated monomer bearing at least one hydroxyl functional group is 2-hydroxyethyl methacrylate.

7. A resinous composition according to claim 1 where the unsaturated polyester has a factor of molecular weight per double bond of between 142 and 215.

8. A resinous composition according to claim 1 where the least partially hydroxylated alkyl methacrylate polymer is present in a proportion of 1 to 30% by weight of the resinous composition.

9. A resinous composition according to claim 1 further comprising glass fibers in a proportion ranging up to 90% by weight of the resinous composition.

10. A resinous composition according to claim 1 where the hydroxylated has a molecular weight of between about 1,500 and 15,000 by size exclusion chromatography.

* * * * *